Patented Sept. 9, 1947

2,426,977

UNITED STATES PATENT OFFICE 2,426,977

DISAZO DYES FROM DIHYDROXY BENZIDINES

Fritz Straub, Kaiseraugst, and Jakob Brassel and Peter Pieth, Basel, Switzerland, assignors to Society of Chemical Industry in Basle, Basel, Switzerland, a Swiss firm No Drawing. Application August 16, 1943, Serial No. 498,884. In Switzerland February 18, 1941

6 Claims. (Cl. 260—180)

This application is a continuation-in-part of our copending application Serial No. 431,172, filed February 16, 1942.

The present invention is concerned with valuable new disazo dyestuffs, and a process for preparing the same. The present invention is particularly concerned with direct dyeing cotton dyestuffs (also called substantive dyestuffs), and still more particularly with dyestuffs capable of being metallized, for instance coppered, in substance, in the dye-bath or on the fiber, as the case may be.

According to the present invention tetrazotized 3:3'-dihydroxy-4:4'-diaminodiphenyl is coupled with two molecular proportions of coupling components as defined hereinafter.

3:3'-dihydroxy-4:4'-diaminodiphenyl, which is a known compound and which may be obtained for instance by saponifying dianisidine by means of aluminum chloride, has not hitherto found any industrial use. Although a few dyestuffs prepared with tetrazotized 3:3' - dihydroxybenzidine have been described in the literature, the said compound has generally been regarded to be of no practical value. This is probably due to several facts. First of all it was generally believed that the said product would be too expensive for the commercial manufacture of dyestuffs. Furthermore, the very few dyestuffs hitherto prepared with the said tetrazo compound did not show properties which might make them compete successfully with other dyestuffs, and it is to be remarked that, according to the prescriptions found in the literature, correct coupling is in most cases not brought about, which obviously does not lead to correct disazo dyestuffs.

According to the present invention it has been found that the cost of 3:3'-dihydroxy-4:4'-diaminodiphenyl is by no means prohibitive for the manufacture of dyestuffs therefrom, since such dyestuffs as hereinafter defined show very valuable properties which more than outweigh any difficulties encountered in preparing the said starting material. Further, it will be shown hereinafter that correct coupling to form correct disazo dyestuffs can be brought about, and that dyestuffs of much superior properties can be produced thereby.

For the sake of simplicity coupling may be carried out with two molecular proportions of the same coupling component. However, it is not unduly difficult to effect coupling with two different coupling components since tetrazotized 3:3'-dihydroxy-4:4'-diaminodiphenyl has a great tendency to couple first with one diazo group and afterwards with the other.

3:3'-dihydroxy-4:4'-diaminodiphenyl may be obtained by saponification of dianisidine by means of aluminum chloride and may be purified if necessary according to known methods. It may be tetrazotized in known manner and the tetrazo compound may be used immediately after tetrazotizing or may be separated, as described in the examples below.

According to one feature of the present invention tetrazotized 3:3'-dihydroxy-4:4'-diaminodiphenyl is coupled with two molecular proportions of coupling components, at least one of which contains at least one nitrogen atom having attached thereto at most one hydrogen atom.

The coupling components containing nitrogen mentioned above, may belong to the isocyclic, heterocyclic or open chain series. As a first group of such components hydroxy naphthalenes containing at least one nuclearly bound sulfonic acid group are to be mentioned. They must contain at least one nitrogen atom which is bound in a form different from primary amino groups. Thus it may be in the form of secondary or acylated amino group, e. g., as an imide linkage between two radicals such as in 5:5'-dihydroxy-2:2'-dinaphthylamino-7:7'-disulfonic acid, 2-phenylamino-5-hydroxynaphthalene-7-sulfonic acid, 2-phenylamino - 8 - hydroxynaphthalene-6-sulfonic acid, or in form of an acid amide group such as in 1-toluenesulfonylamino-8-hydroxynaphthalene-4-sulfonic acid or in the form of a nitro group. The said nitrogen atom may further be present as a member of a heterocyclic ring such as in pyrazolones. It is, as a rule, desirable to select the coupling components so as coupling will take place in the ortho position to a hydroxyl group.

Besides the above mentioned coupling components other suitable components, such as aminonaphtholsulfonic acids in which the amino group is acylated by any suitable carboxylic or sulfonic acid, may be used, wherein the acid may be aliphatic (formic, acetic, propionic acid etc.) aromatic (benzoic, naphthoic acid etc.) or heterocyclic (pyridine-carbamic acid etc.) and contain further substituents. If only one coupling component of this kind is used as remaining coupling components any such component may be used, for instance those belonging to the benzene, naphthalene or open-chain series.

Such components are, for example, the various dihydroxynaphthalenes, such as -1:5-, 2:6- and -2:7-dihydroxy-naphthalene, 2-amino - 7 - hydroxynaphthalene, 1-amino-7-hydroxynaphthalene, 2:6 - dihydroxynaphthalene-monoglycerine ether, as well as N-substituted amino-hydroxynaphthalenes, in which the amino group, for example, can be substituted by alkyl or hydroxyalkyl radicals. Furthermore such hydroxynaphthalenes also come into consideration which contain other substituents besides those mentioned above, e. g. a sulfonamide group.

Particularly valuable dyestuffs are obtained if hydroxynaphthalenes are used which are absolutely free from water solubilizing groups and, for example, are also free from carboxyl groups. These dyestuffs can be advantageously dyed from baths rendered alkaline with alkali hydroxide.

According to another feature of the present invention a tetrazotized 3:3'-dihydroxy-4:4'-diamino diphenyl is coupled with two molecular proportions of coupling components at least one of which is a 1-hydroxynaphthalene containing an auxochromic group in the 8-position. Such auxochromic groups are, for instance, an amino or a substituted amino group, or a further hydroxyl group, or any other group possessing auxochrome properties. These coupling components may carry further substituents in suitable positions of the naphthalene nucleus, for instance solubilizing groups, such as sulfonic acid or carboxyl groups or both, as well as non-solubilizing substituents, such as halogen.

In all the instances mentioned above coupling is effected in an alkaline medium. It is to be remarked, however, that there are many coupling components, especially those of the naphthalene series, which do not combine in a satisfactory manner with tetrazotized 3:3'-dihydroxy-4:4'-diaminodiphenyl when coupling occurs in the usual manner, i. e. in a medium alkaline with sodium carbonate, even if pyridine or similar promoters are added. The combination is often incomplete to such an extent that only little or no diazo dyestuff is produced, and a monoazo dyestuff is obtained as main product. It is a further feature of the present invention that in all instances where combination is slow and/or incomplete with the usual coupling methods, coupling is effected in a medium alkaline with a hydroxide of the alkali or alkaline earth metal series including ammonia. It is often desirable to use strongly caustic alkaline media, for instance strong solutions of caustic potash or soda, but, in other instances, the hydroxides of calcium, barium, strontium or magnesium are suitable too, whereas media substantially free from carbonate generally appear to be desirable whenever combination is difficult.

Many of the foregoing dyestuffs yield very valuable complex metal compounds if treated in substance with agents yielding metal. This is especially true of those dyestuffs which contain more than two sulfonic acid groups, for instance those derived from two coupling components belonging to the group of hydroxynaphthalene disulfonic acid coupling components. With other dyestuffs it may be more advantageous to effect metallization during or, still better, after dyeing according to the known aftertreating methods. With special advantage use may be made of the dyeing methods described in U. S. Patents 2,148,659 and 2,185,905, whereby metallizing is preferably carried out with agents yielding metal which are stable towards alkalies, for instance complex tartrates of copper or other metals.

In some cases it may also be useful to treat some dyestuffs as mentioned above in substance with such alkaline metallizing agents.

Furthermore it is possible to make use of complex metal compounds of the dyestuffs according to the present invention for coloring masses, varnishes, lacquers, resins, both artificial and natural, and spinning solutions.

Whether it is preferable to produce the aforementioned complex metal compounds on the fiber or in substance depends on various properties thereof, inter alia, whether the complex metal compounds are soluble, whether the metal-free dyestuffs possess sufficient affinity for the fiber to be dyed, etc.

The following examples illustrate the invention, the parts being by weight unless otherwise stated:

*Example 1*

10.8 parts of 3:3'-dihydroxybenzidine are tetrazotized in the usual manner in a hydrochloric acid solution with sodium nitrite. The crystalline precipitated tetrazoxide is added to a mixture of 37.5 parts 2-(4'-hydroxy-3'-carboxyphenyl)-amino-5-hydroxynaphthalene-7-sulfonic acid and 30 parts calcium hydroxide in 200 parts of water cooled to 5° C. Stirring is carried out for 2 hours at 5 to 8° C., for 24 hours at 15 to 20° C. and coupling is finished at 28 to 30° C. The coupling mixture is diluted with 1000 parts of hot water and 60 parts of anhydrous sodium carbonate are added. After stirring for half an hour at 50° C., the liquid is filtered off from the precipitated calcium carbonate. After neutralizing with hydrochloric acid, the dyestuff is precipitated from the filtrate by the addition of sodium chloride and dried.

The dyestuff of the formula

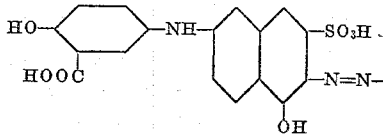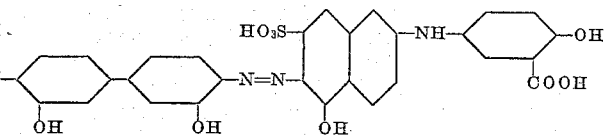

The disazo dyestuffs of the present invention are suitable for dyeing and printing the most diverse materials, especially cellulose fibers, such as cotton and other vegetable fibers, rayon from regenerated cellulose including staple fibers, and also for dyeing and printing animal fibers such as wool, silk and leather. Due to the fact that the said dyestuffs are derived from an ortho-hydroxydiazo compound they are capable of forming complex metal compounds, for instance, with the metals copper, cobalt, nickel, iron, chromium, vanadium, manganese.

is a dark powder and dyes cotton. After coppering it yields pure blue shades which are fast to washing and light.

*Example 2*

21.6 parts of 3:3'-dihydroxy-4:4'-diaminodiphenyl in the form of the hydrochloride, are stirred in 100 parts of water and 12 parts of concentrated hydrochloric acid and tetrazotized at 5 to 8° C. with an aqueous solution of 13.8 parts of sodium nitrite. When the reaction is complete, the suspension is cooled to 3° C. and neutralized by the addition of 6.4 parts anhydrous sodium carbonate and the precipitated tetrazo compound is filtered off.

58.5 parts of 2-(β-hydroxyethyl)-amino-5-hydroxy-naphthalene-7-sulfonic acid are stirred into a freshly prepared milk of lime consisting of 22.4 parts of burnt lime and 280 parts of water. This is cooled to 5° C. and the above mentioned tetrazo compound is added and coupling is carried out during 4 hours at 5 to 8° C. during 24 hours at 10–15° C. and until the reaction is complete at 20 to 30° C. Hereupon it is diluted with 2000 parts of water at 50° C. and 60 parts of soda are added and the liquid filtered from the precipitated calcium carbonate. 120 parts of sodium chloride are added to the filtrate and the new dyestuff is precipitated by adding drop by drop 200 parts of hydrochloric acid of 10 percent strength.

When dried the resultant powder is black with a bronzy appearance. The new dyestuff yields pure blue shades which have very good fastness properties on being dyed and coppered on cotton by either a one or two bath process.

Example 3

21.6 parts of 3:3'-dihydroxy-4:4'-diaminodiphenyl, in the form of its dichlorhydrate, are stirred in 100 parts of water and 12 parts of concentrated hydrochloric acid and is tetrazotized by addition of an aqueous solution of 13.8 parts of sodium nitrite at 5–8° C. When tetrazotization is complete, the suspension is cooled to 3° C., neutralized by addition of 6.4 parts of soda and filtered to obtain the precipitated tetrazo compound.

103 parts of the disodium salt of 5:5'-dihydroxy-2:2'-dinaphthylamine-7:7'-disulfonic acid are dissolved in 130 parts of water and 30 parts of potassium hydroxide. The solution is cooled to 5° C., and the above tetrazo compound is added to it whilst stirring thoroughly. Coupling is carried out for 2 hours at 5–8° C. and 24 hours at 10–15° C. Finally, the coupling temperature is raised to 20–30° C. When coupling is complete, the mass is diluted with 1000 parts of water, 65 parts of sodium chloride are added at 55° C. and the dyestuff is precipitated by addition of 200 parts by volume of hydrochloric acid of 5 per cent. strength. The disazo dyestuff is purified by dissolving it in 2000 parts of water and 10.6 parts of soda and salting it out.

It possesses the formula

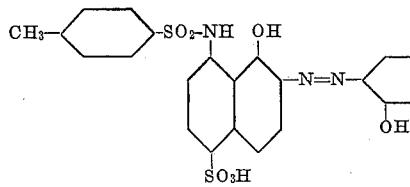

and, when dried, is a black, bronzy powder which dissolves in water to a violet solution, in 10 per cent. soda solution to a blue solution, in 10 per cent. caustic soda solution to a blue-violet and in concentrated sulfuric acid to a greenish-blue solution. The new disazo dyestuff yields fast blue shades on being dyed and coppered on cotton by either a one or two bath process.

Example 4

21.6 parts of 3:3'-dihydroxy-4:4'-diaminodiphenyl are tetrazotized, neutralized and filtered as described in Example 3.

64.5 parts of 1-phenylamino-8-hydroxynaphthalene-4-sulfonic acid are dissolved in 160 parts by volume of caustic potash of 40 per cent strength by volume and are cooled to 5° C. The filtered tetrazo solution is added, and the whole is stirred for 2 hours at 5–8° C. and then, until coupling is complete, at 10–20° C. The new disazo dyestuff is for the most part precipitated. It is filtered off and purified by dissolving in dilute soda solution and salting out.

The new dyestuff of the formula

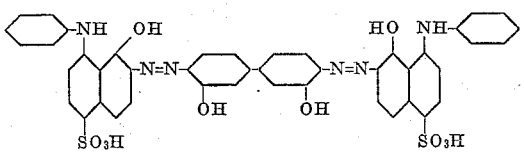

is a black powder when dry which dissolves in water with a blue color, in 10 per cent. soda solution to a greenish-blue, in 10 per cent. caustic soda to a reddish blue and in concentrated sulfuric acid to a bluish green solution. When dyed and coppered—by a one or a two bath method—on cotton, it yields, green-blue shades of good fastness.

Example 5

21.6 parts of 3:3'-dihydroxy-4:4'-diaminodiphenyl are tetrazotized, neutralized and filtered as described in Example 3.

81 parts of 1-toluene-sulfonylamino-8-hydroxynaphthalene-4-sulfonic acid are stirred in 240 parts of water and 29.6 parts of slaked lime are added. The reaction mixture is cooled to 5° C. and the filtered tetrazo solution is added. Coupling is carried out for 2 hours at 5–8° C., then for 24 hours at 10–15° C., and, to conclude the reaction, for 24 hours at 20–25° C. The reaction mass is then diluted with 800 parts of water. A solution of 60 parts of soda in 300 parts of water is added, and the solution is filtered from the calcium carbonate precipitated. The new dyestuff is partly salted out by addition of 150 parts of common salt, and salting out is completed by dropping in 140 parts of 10 per cent hydrochloric acid.

The new dyestuff possesses the formula

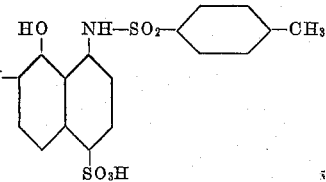

and, when dry, is a bronzy black powder, dissolving in water to a blue, in 10 per cent. caustic soda to a reddish blue, in 10 per cent. soda solution to a blue and in concentrated sulfuric acid to a green solution. When dyed on cotton and aftertreated with copper salts, either by a oneor by a two-bath process, green shades of good fastness are obtained.

Example 6

10.8 parts of 3:3'-dihydroxybenzidine are tetrazotized in the usual manner by means of 6.9 parts of sodium nitrite in the presence of hydrochloric acid. After neutralizing the excess of mineral acid, the crystallized tetrazo hydroxide is filtered off and is introduced into a solution of 31.5 parts of phenyl-J-acid and 15 parts of potassium hydroxide in 70 parts by volume of water. The coupling mixture is stirred for 40–50 hours at 20–25° C., and the dyestuff is then precipitated by neutralization with dilute hydrochloric acid.

The dyestuff, which has the formula

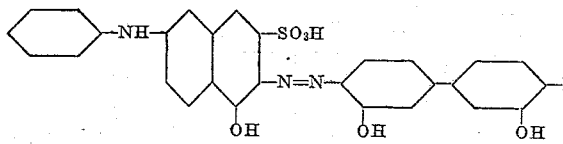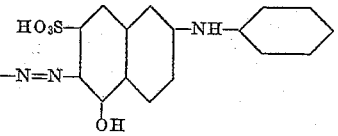

is, in the dry state, a dark colored powder, which dissolves in water to a violet and in sulfuric acid and dilute alkalis to a blue solution. It dyes cotton and regenerated cellulose in blue shades which, especially when treated with copper salts, possess excellent fastness to washing and light.

Example 7

21.6 parts of 3:3'-dihydroxy-4:4'-diaminodiphenyl are tetrazotized, neutralized and filtered as described in Example 3.

103 parts of the disodium salt of 5:5'-dihydroxy-2:2'-dinaphthylamine-7:7'-disulfonic acid are dissolved in 190 parts of water and 30 parts of caustic soda. The solution is cooled to 5° C., and the filtered tetrazo solution is introduced whilst stirring well. The coupling temperature is maintained for 2 hours at 5–8° C., 24 hours at 10–15° C. and, finally, several hours at 20–25° C. When the coupling is complete, the mass is diluted with 1000 parts of water at 55° C., 60 parts of common salt are added and the dyestuff is precipitated by addition of 200 parts by volume of 5 per cent. hydrochloric acid. The new disazo dyestuff can be purified by dissolving it in dilute soda solution and salting out.

When dry, it is a bronzy black powder which dissolves in water to a violet, in 10 per cent. soda solution to a blue, in 10 per cent. caustic soda to a blue violet, and in concentrated sulfuric acid to a green-blue solution. When dyed on cotton and coppered, by either a one- or a two-bath process, it yields fast blue shades.

Example 8

21.6 parts of 3:3'-dihydroxy-4:4'-diaminodiphenyl are tetrazotized as described in Example 3, the solution is neutralized with soda solution and the precipitated tetrazo compound is filtered off.

103 parts of the disodium salt of 5:5'-dihydroxy-2:2'-dinaphthylamine-7:7'-disulfonic acid are dissolved in 300 parts of water and 100 parts of ammonia containing 25 per cent of $NH_3$. The solution is cooled to 5° C., the tetrazo compound is introduced and coupling is carried out for 2 hours at 5–8° C. and, afterwards, at 10–30° C. until the reaction is complete. The reaction mass is diluted with 1000 parts of water and the dyestuff is precipitated by salting out. It is purified by dissolving in dilute soda solution and salting out.

The new dyestuff, when dry, is a black powder which dissolves in water to a violet, in 10 per cent. soda solution to a blue, in 10 per cent. caustic soda to a blue violet, and in concentrated sulfuric acid to a greenish blue solution. When dyed on cotton and aftertreated with copper salts, either by a one-bath or by a two-bath process, it yields blue shades having very good fastness properties.

Example 9

10.8 parts of 3:3'-dihydroxybenzidine are tetrazotized in the usual manner with 6.9 parts of sodium nitrite in the presence of hydrochloric acid. The crystallized tetrazoxide is filtered off and at 5° C. is added to a mixture of 12 parts of 1:8-dihydroxynaphthalene-4-sulfonic acid and 20 parts calcium hydroxide in 150 parts of water. Stirring is carried out for 1 hour at 5 to 8° C. and for 1 hour at 10 to 15° C. Hereupon a mixture of 15.3 parts of 2-phenylamino-5-hydroxynaphthalene-7-sulfonic acid, 9 parts calcium hydroxide and 100 parts of water is added and stirred for 1 hour at 15 to 20° C. and coupling is carried to an end at 25 to 30° C. The coupling mixture is diluted with 1000 parts of hot water and after the addition of 65 parts of anhydrous sodium carbonate, the temperature is maintained at 80 to 85° C. for half an hour. The liquid is filtered off from the precipitated calcium carbonate and sodium chloride and hydrochloric acid are added to the filtrate. The disazo dyestuff is filtered off and dried. When dry it forms a dark green bronzy powder which dissolves in water and dilute caustic alkalies to reddish blue, in dilute soda solution to a cornflower blue and in concentrated sulfuric acid to a greenish blue solution. It yields pure blue shades of very good fastness to washing and light on being dyed and coppered on vegetable fibers by either a one or two bath process.

If in the present example 1:8-dihydroxynaphthalene-4-sulfonic acid is replaced by an equivalent quantity of 2-(4'-hydroxy-3'-carboxyphenyl)-amino-5-hydronaphthalene-7-sulfonic acid, then a dyestuff is obtained which produces almost the same shades of similar fastness properties.

Example 10

21.6 parts of 3:3'-dihydroxy-4:4'-diaminodiphenyl are dissolved in a mixture of 10 parts by volume of hydrochloric acid of 30% strength and 200 parts of water and are tetrazotized by addition of an aqueous solution of 13.8 parts of sodium nitrite; the reaction mixture is then neutralized and the tetrazo compound filtered off.

75 parts of 1-acetylamino-8-hydroxynaphthalene-3:6-disulfonic acid are stirred into a suspension of 30 parts of calcium hydroxide in 300 parts of water and cooled to 3° C. The filtered tetrazo compound is added and coupling carried out for 3 hours at 3 to 5° C., for 2 hours at 5 to 10° C., for 16 hours at 10 to 15° C. and till the termination of the reaction at 20 to 25° C. Hereupon it is diluted with 400 parts of water and a solution of 45 parts of soda in 250 parts of water is added and the liquid filtered off from the calcium carbonate. The new dyestuff is precipitated by the addition of sodium chloride.

When dry it forms a black powder which yields blue shades with good fastness properties on being dyed and coppered on cotton by either a one or two bath process.

*Example 11*

105 parts of the disazo dyestuff obtained according to Example 10 from tetrazotized 3:3'-dihydroxy-4:4'-diaminodiphenyl and 2 molecular proportions of 1-acetylamino-8-hydroxynaphthalene-3:6-disulfonic acid are dissolved in 3000 parts of water at 80° C. and stirred for 15 minutes with a solution of 55 parts of copper sulphate made alkaline with soda and 110 parts of sodium tartrate. The new copper compound is obtained by salting out.

When dry it forms a greyish black powder which dyes cotton pure blue shades with good fastness properties.

*Example 12*

21.6 parts of 3:3'-dihydroxy-4:4'-diaminodiphenyl are tetraoztized as described in Example 3, the solution is neutralized with soda solution and the precipitated tetrazo compound is filtered off.

66 parts of 1-amino-8-hydroxynaphthalene-3:6-disulfonic acid are stirred in 200 parts of water and 29.6 parts of calcium hydroxide are added. The suspension is cooled to 5° C., and the filtered tetrazo compound is added. The coupling temperature is maintained for 2 hours at 5–8° C.

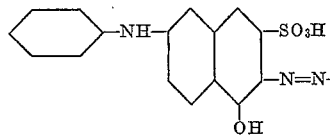

and then for 24 hours at 10–20° C., when a solution of 60 parts of soda in 300 parts of water at

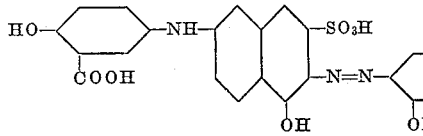

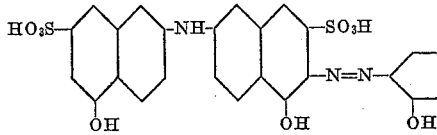

50° C. is added to the reaction mass, and the calcium carbonate is removed by filtering. The filtrate is stirred with 100 parts of common salt, and the new dyestuff is obtained by dropping in 135 parts of 10 per cent hydrochloric acid.

96.4 parts of the disazo dyestuff thus obtained are dissolved in 3500 parts of water at 70° C. 40 parts of acetic anhydride are added and the whole stirred for 10 minutes. The acetyl compound of the disazo dyestuff is precipitated by the addition of sodium chloride. The acetyl compound of the disazo dyestuff is dissolved in 2000 parts of water at 80° C. and a solution of 55 parts of crystallized copper sulphate made alkaline with soda and 110 parts of sodium tartrate in 500 parts of water are added and stirred for 15 minutes at 80 to 90° C.

The new copper compound is precipitated by adding sodium chloride.

When dry it forms a greyish black powder which yields on cotton pure blue shades with good fastness properties.

It is to be understood that the term "hydroxide of the alkali metal series" includes aqueous solutions of ammonia.

What we claim is:

1. Disazo dyestuffs of the general formula

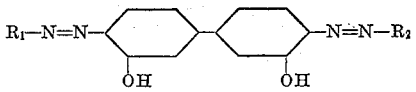

wherein $R_1$ and $R_2$ stand for radicals of amino-hydroxy-naphthalene sulfonic acids wherein the amino group is selected from the group consisting of acylated, alkylated and arylated secondary amino groups.

2. Disazo dyestuffs of the general formula

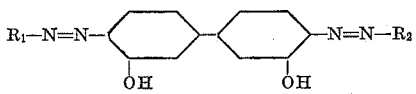

wherein $R_1$ and $R_2$ stand for radicals selected from the group consisting of arylamino-hydroxy-naphthalene sulfonic acids of the benzene and naphthalene series.

3. Disazo dyestuffs of the general formula

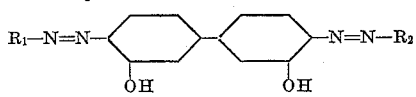

wherein $R_1$ and $R_2$ stand for radicals of phenyl-amino-hydroxynaphthalene sulfonic acids.

4. The disazo dyestuff of the formula

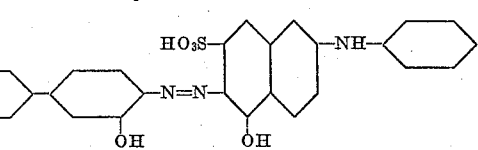

5. The disazo dyestuff of the formula

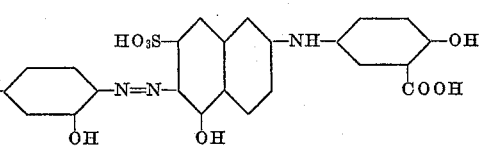

6. The disazo dyestuff of the formula

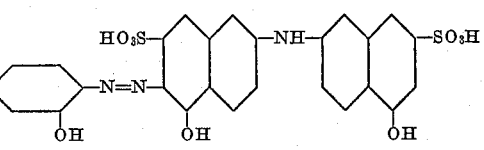

FRITZ STRAUB.
JAKOB BRASSEL.
PETER PIETH.

REFERENCES CITED

The following references are of record in the file of this patent:

UNITED STATES PATENTS

| Number | Name | Date |
|---|---|---|
| 1,889,732 | Stusser et al. | Nov. 29, 1932 |
| 1,210,751 | Anderwert et al. | Jan. 2, 1917 |
| 2,241,796 | Taube et al. | May 13, 1941 |
| 2,193,438 | Taube et al. | Mar. 12, 1940 |

FOREIGN PATENTS

| Number | Country | Date |
|---|---|---|
| 102,881 | Great Britain | Jan. 4, 1917 |
| 16,092 | Great Britain | July 22, 1909 |
| 352,956 | Great Britain | July 14, 1931 |
| 163,896 | Switzerland | Nov. 16, 1933 |